United States Patent
Fukunaga et al.

(10) Patent No.: US 8,379,369 B2
(45) Date of Patent: Feb. 19, 2013

(54) BASE MATERIAL FOR SOLID ELECTROLYTIC CAPACITOR, CAPACITOR USING THE BASE MATERIAL, AND METHOD FOR MANUFACTURING THE CAPACITOR

(75) Inventors: Hirofumi Fukunaga, Tokyo (JP); Hideki Oohata, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 774 days.

(21) Appl. No.: 12/442,763

(22) PCT Filed: Sep. 21, 2007

(86) PCT No.: PCT/JP2007/068358
§ 371 (c)(1),
(2), (4) Date: Mar. 25, 2009

(87) PCT Pub. No.: WO2008/038584
PCT Pub. Date: Apr. 3, 2008

(65) Prior Publication Data
US 2010/0103589 A1    Apr. 29, 2010

(30) Foreign Application Priority Data
Sep. 25, 2006    (JP) .................................. 2006-258697

(51) Int. Cl.
*H01G 9/07* (2006.01)
(52) U.S. Cl. ........ 361/524; 361/523; 361/528; 361/532; 29/25.03
(58) Field of Classification Search .................. 361/523, 361/524, 532, 528; 29/25.03
See application file for complete search history.

(56) References Cited

U.S. PATENT DOCUMENTS

| | | | | |
|---|---|---|---|---|
| 3,293,507 A * | 12/1966 | Smith | ........................... | 361/518 |
| 3,466,508 A * | 9/1969 | Booe | ............................ | 361/536 |
| 3,828,227 A * | 8/1974 | Millard et al. | ................ | 361/540 |
| 3,970,903 A * | 7/1976 | Shirn | ............................ | 361/533 |
| 4,090,288 A * | 5/1978 | Thompson et al. | .......... | 29/25.03 |
| 4,203,194 A * | 5/1980 | McGrath | ...................... | 29/25.03 |
| 4,571,664 A * | 2/1986 | Hyland | ......................... | 361/540 |
| 4,660,127 A * | 4/1987 | Gunter | ......................... | 361/540 |
| 5,410,445 A * | 4/1995 | Kanetake | ...................... | 361/539 |

(Continued)

FOREIGN PATENT DOCUMENTS
EP    1863044 A1 * 12/2007
JP    53-140973 A    12/1978

(Continued)

*Primary Examiner* — Anatoly Vortman
(74) *Attorney, Agent, or Firm* — Sughrue Mion, PLLC

(57) ABSTRACT

The invention relates to a substrate for solid electrolytic capacitor, wherein a first layer in the shielding layer formed by laminating a plurality of layers on top of each other, provided in an area for separating an anode part and a cathode part of the substrate for a solid electrolytic capacitor having a porous layer on its surface from a solution or dispersion of a heat resistant resin or its precursor, free from a shielding layer modification additive (except for a silane coupling agent) or containing a shielding layer modification additive content of not more than 0.1% by mass (based on the mass of the heat resistant resin or its precursor). The present invention enables to provide a method for producing a substrate for a solid electrolytic capacitor comprising a shielding layer made of a masking material which ensures the insulation between the anode part and the cathode part of the solid electrolytic capacitor; and a solid electrolytic capacitor using the substrate.

18 Claims, 2 Drawing Sheets

U.S. PATENT DOCUMENTS

| | | | |
|---|---|---|---|
| 5,891,986 | A | 4/1999 | Yamaguchi et al. |
| 6,238,444 | B1 * | 5/2001 | Cadwallader ............... 29/25.03 |
| 6,890,363 | B1 | 5/2005 | Sakai et al. |
| 6,970,345 | B2 * | 11/2005 | Oh et al. ....................... 361/540 |
| 7,443,653 | B2 * | 10/2008 | Kim et al. ..................... 361/523 |
| 7,570,480 | B2 * | 8/2009 | Kim et al. ..................... 361/540 |
| 2003/0218858 | A1 | 11/2003 | Kim et al. ..................... 361/523 |
| 2004/0066607 | A1 * | 4/2004 | Edson et al. .................. 361/528 |
| 2004/0233615 | A1 | 11/2004 | Sakai et al. |
| 2005/0088805 | A1 * | 4/2005 | Edson et al. .................. 361/529 |
| 2006/0260109 | A1 * | 11/2006 | Vaisman et al. ............. 29/25.41 |
| 2006/0262489 | A1 * | 11/2006 | Vaisman et al. ............. 361/540 |
| 2007/0177333 | A1 * | 8/2007 | Umemoto et al. ............ 361/502 |
| 2007/0279841 | A1 * | 12/2007 | Kim et al. ..................... 361/540 |
| 2008/0019081 | A1 * | 1/2008 | Kim et al. ..................... 361/535 |
| 2008/0049381 | A1 * | 2/2008 | Saida et al. ................... 361/523 |
| 2008/0062617 | A1 * | 3/2008 | Edson et al. .................. 361/529 |
| 2008/0080124 | A1 * | 4/2008 | Kim et al. ..................... 361/529 |
| 2009/0154065 | A1 * | 6/2009 | Choi et al. .................... 361/523 |
| 2009/0154066 | A1 * | 6/2009 | Choi et al. .................... 361/523 |
| 2009/0154068 | A1 * | 6/2009 | Choi et al. .................... 361/533 |

FOREIGN PATENT DOCUMENTS

| | | |
|---|---|---|
| JP | 05-047611 A | 2/1993 |
| JP | 07094368 A * | 4/1995 |
| JP | 07-272979 A | 10/1995 |
| JP | 10-182820 A | 7/1998 |
| WO | 00/67267 A1 | 11/2000 |

* cited by examiner

Region where S is detected

US 8,379,369 B2

BASE MATERIAL FOR SOLID ELECTROLYTIC CAPACITOR, CAPACITOR USING THE BASE MATERIAL, AND METHOD FOR MANUFACTURING THE CAPACITOR

TECHNICAL FIELD

The present invention relates to a substrate for a solid electrolytic capacitor, solid electrolytic capacitor using the same, and production method thereof. More specifically, the invention relates to a solid electrolytic capacitor comprising a shielding film providing excellent insulation between a metal substrate part without being provided with solid electrolyte (anode part) and a electroconductive layer made of conductive paste and the like (cathode part) on the substrate for a solid electrolytic capacitor having a porous layer on the surface.

BACKGROUND ART

Generally, a solid electrolytic capacitor is obtained by (i) subjecting the surface of an anode body of a valve-action metal such as aluminum, tantalum, niobium, titanium or alloys of these metals to make the surface rough with micropores on the order of microns formed thereon to thereby increase the surface area, (ii) forming a dielectric oxide film thereon through chemical formation, (iii) impregnating a solid electrolyte via a separator between the film and the anode part or forming a solid electrolyte layer therebetween, (iv) forming a cathode electroconductive layer from carbon paste and a metal-containing electroconductive paste thereon, (v) welding the body to a lead frame which serves as an external electrode and then (vi) forming an outer casing of epoxy resin or the like.

Particularly, since solid electrolytic capacitors using as solid electrolyte electroconductive polymers can have reduced equivalent series resistance and leakage current as compared with solid electrolytic capacitors using manganese dioxide as solid electrolyte, they are useful as capacitors meeting demands for higher performance and downsizing of electronic devices and many production methods have been proposed.

When a high-performance solid electrolytic capacitor is produced by using an electroconductive polymer, particularly in case of using a valve-action metal foil, it is indispensable to ensure electrical insulation between anode part serving as anode part and cathode part consisting of electroconductive layer containing electroconductive polymer. However, in a step of impregnating or forming solid electrolyte, it sometimes occurs that solid electrolyte intrudes into the anode region, so-called "creeping up". In such a case, insulation failure is caused between the anode part and the cathode part.

Examples of shielding measure for insulating the anode part of solid electrolytic capacitor from the cathode part include a method where after a polyamic acid film is formed by allowing a solution containing polyamic acid salt to electrodeposit on at least one part of valve-action metal having no solid electrolyte formed thereon, a polyimide film is formed by dehydration and curing with heat on the part (Patent Document 1: Japanese Patent Application Laid-Open No. H05-47611), and a method for producing solid electrolyte comprising a coating step of a masking material solution which infiltrates into a dielectric film of a solid electrolytic capacitor and forms a masking layer on the infiltrated part (Patent Document 2: International Publication No. WO00/67267 pamphlet (U.S. Pat. No. 6,890,363)).

Generally, various additives for modifying the shielding layer are added to the masking material solution in order to improve bonding to another substrate, the surface conditions and leveling property. For example, a polyimide precursor composition having a high concentration and a low viscosity which can give a heat resistant polyimide film is disclosed (Patent Document 3: JP-A-H10-182820) (U.S. Pat. No. 5,891,986), to which a surface tension-controlling agent and a thixotropic agent can be incorporated as a preferred embodiment.

As a surface tension-controlling agent, a silicone surface tension-controlling agent such as silicone oil, a non-silicone surface tension-controlling agent such as a higher fatty acid ester of glycerol, a borate of a higher fatty alcohol and a fluorine-containing surface active agent can be suitably used, and it is known that the surface tension-controlling agent can be incorporated in an amount of 0.01 to 1 mass % (to the mass of the masking material).

Patent Document 1: Japanese Patent Application Laid-Open No. H05-47611
Patent Document 2: International Publication No. WO00/67267 pamphlet
Patent Document 3: Japanese Patent Application Laid-Open No. H10-182820

DISCLOSURE OF INVENTION

Problems to be Solved by Invention

In the method of forming a polyimide film through electrodeposition (Patent Document 1), it is advantageous as compared with general coating methods in that the film can be formed even on the fine pores, however, the method including electrodeposition step requires high cost and further, dehydration step at a high temperature is required to form a polyimide film.

The production method of solid electrolyte including a coating step of a masking material solution which infiltrates into a dielectric film and forms a masking layer on the infiltrated part (Patent Document 2) has a problem such that the coating solution cannot infiltrate deep enough in the pores depending on the surface condition of the dielectric film or formation condition of the fine pores such as pore size distribution, which is considered to be influenced by the viscosity and the like of the masking material.

Even when a polyimide precursor composition having a high concentration and a low viscosity which can give a heat resistant polyimide film (Patent Document 3) is used, the composition cannot infiltrate deep in the aluminum etching layer and has not been optimized as a shielding material between the anode part and the cathode part of a capacitor.

As described above, none of conventional masking methods is satisfactory. There have been demands for a masking material which can ensure insulation between the anode part and the cathode part in a solid electrolytic capacitor.

Accordingly, with a view to solving the above problems in conventional technique, an object of the present invention is to provide an anode substrate for solid electrolytic capacitor (in the present Specification and Claims, referred to as "substrate for solid electrolytic capacitor") which can ensure insulation between the anode part region and the cathode part region, a capacitor using the substrate and production method thereof for the purpose of stabilize quality of solid electrolytic capacitors and enhancing productivity.

Means for Solving Problems

As a result of intensive studies to achieve the above purpose, the present inventors have found out that a shielding layer having a more improved insulating property and higher reliability can be obtained unexpectedly when the above-mentioned shielding layer of a solid electrolytic capacitor is formed from a masking material solution which does not contain additives for modifying the shielding layer (except a silane coupling agent) which have been considered essential or desirable.

Thus, according to the present invention, a solid electrolytic capacitor, a substrate for a solid electrolytic capacitor and production method thereof as follows can be provided.

The above object of the present invention has been achieved by providing, in a first aspect, a solid electrolytic capacitor, comprising a shielding layer formed by laminating a plurality of layers in an area for separating the anode part and the cathode part of the substrate for a solid electrolytic capacitor comprising a porous layer on the surface; wherein, among the shielding layers formed by laminating layers, a first shielding layer formed by being laminated directly on the substrate for a solid electrolytic layer is made of a solution or dispersion of a heat resistant resin or its precursor, free from additives for modifying a shielding layer (except a silane coupling agent) or containing additives for modifying the shielding layer in an amount of 0.1 mass % or less (based on the mass of a heat resistant resin or its precursor).

In a preferred embodiment of the present invention, a solid electrolytic capacitor as described above has an additive for modifying the shielding layer that is a surface tension-controlling agent and a thixotropic agent.

In another preferred embodiment of the present invention, a solid electrolytic capacitor as described above has a solution or dispersion of the heat resistant resin or its precursor that is a solution of a polyimide resin or a varnish of polyamic acid.

In yet another preferred embodiment of the present invention, a solid electrolytic capacitor as described above has a solution or dispersion of the heat resistant resin or its precursor that is a solution of a polyimide resin or a varnish of poly(amic acid) and the solution or the varnish contains a silane coupling agent of 0.1 to 5 mass % (based on the amount of the polyimide resin or poly(amic acid)) without containing a surface tension-controlling agent and a thixotropic agent as additives for modifying the shielding layer; or contains a total amount of 0.1 mass % or less of a surface tension-controlling agent and a thixotropic agent (based on the mass of the heat resistant resin or its precursor).

In yet another preferred embodiment of the present invention, a solid electrolytic capacitor as described above has a second shielding layer formed on the first shielding layer which is formed by being laminated directly on the substrate for a solid electrolytic capacitor that is made of a solution or dispersion of a heat resistant resin or its precursor containing the additives for modifying the shielding layer.

In yet another preferred embodiment of the present invention, a solid electrolytic capacitor as described above has an additive for modifying the shielding layer is a surface tension-controlling agent or a thixotropic agent.

The above object of the present invention has been achieved by providing, in a second aspect, a substrate for a solid electrolytic capacitor, wherein a heat-resistant resin layer is formed which comprises a shielding layer formed by laminating a plurality of layers is formed on at least a part of the substrate for a solid electrolytic capacitor having a porous layer on the surface, and the first shielding layer formed by being laminated directly on the substrate for a solid electrolytic layer is made of a solution or dispersion of a heat resistant resin or its precursor free from additives for modifying a shielding layer (except a silane coupling agent) or containing the amount of the additives for modifying the shielding layer is 0.1 mass % or less (based on the mass of the heat resistant resin or its precursor).

In a preferred embodiment of the present invention, a substrate for a solid electrolytic capacitor as described above has an additive for modifying the shielding layer that is a surface tension-controlling agent and a thixotropic agent.

In another preferred embodiment of the present invention, a substrate for a solid electrolytic capacitor as described above has a solution or dispersion of the heat resistant resin or its precursor that is a solution of a polyimide resin or a varnish of polyamic acid.

In yet another preferred embodiment of the present invention, a substrate for a solid electrolytic capacitor as described above has a solution or dispersion of the heat resistant resin or its precursor that is a solution of a polyimide resin or a varnish of polyamic acid and the solution or the varnish contains a silane coupling agent of 0.1 to 5 mass % (based on the mass of the polyimide resin or polyamic acid) without containing a surface tension-controlling agent and a thixotropic agent as additives for modifying the shielding layer; or contains a total amount of 0.1 mass % or less of a surface tension-controlling agent and a thixotropic agent (based on the mass of the heat resistant resin or its precursor).

In yet another preferred embodiment of the present invention, a substrate for a solid electrolytic capacitor as described above has a second shielding layer formed on the first shielding layer which is formed by being laminated directly on the substrate for a solid electrolytic capacitor that is made of a solution or dispersion of a heat resistant resin or its precursor containing the additives for modifying the shielding layer.

In yet another preferred embodiment of the present invention, a substrate for a solid electrolytic capacitor as described above has an additive for modifying the shielding layer is a surface tension-controlling agent and a thixotropic agent.

A The above object of the present invention has been achieved by providing, in a third aspect, a method for producing a solid electrolytic capacitor comprising a shielding layer formed by laminating a plurality of layers in the region separating the anode part region and the cathode part region of the substrate for a solid electrolytic capacitor comprising a porous layer on the surface; comprising forming a first shielding layer being laminated directly on the substrate for a solid electrolytic layer among the shielding layer formed by laminating layers by applying a solution or dispersion of a heat resistant resin or its precursor free from additives for modifying a shielding layer (except a silane coupling agent) or containing the additives for modifying the shielding layer in an amount of 0.1 mass % or less (based on the mass of the heat resistant resin or its precursor) to the region separating the anode part region and the cathode part region of the substrate for a solid electrolytic capacitor followed by drying.

In a preferred embodiment of the present invention, a method for producing a solid electrolytic capacitor as described above has an additive for modifying the shielding layer that is a surface tension-controlling agent and a thixotropic agent.

In another preferred embodiment of the present invention, a method for producing a solid electrolytic capacitor as described above has a solution or dispersion of the heat resistant resin or its precursor that is a solution of a polyimide resin or a varnish of polyamic acid.

In yet another preferred embodiment of the present invention, a method for producing a solid electrolytic capacitor as described above has a solution or dispersion of the heat resistant resin or its precursor that is a solution of a polyimide resin or a varnish of poly(amic acid) and the solution or the varnish contains a silane coupling agent of 0.1 to 5 mass % (based on the mass of the polyimide resin or polyamic acid) without containing a surface tension-controlling agent and a thixotropic agent as additives for modifying the shielding layer; or contains a total amount of 0.1 mass % or less of a surface tension-controlling agent and a thixotropic agent (based on the mass of the heat resistant resin or its precursor).

In yet another preferred embodiment of the present invention, a method for producing a solid electrolytic capacitor as described above has a second shielding layer, which is formed on the first shielding layer formed by being laminated directly on the substrate for a solid electrolytic capacitor among the shielding layers formed by laminating layers, that is made of a solution or dispersion of a heat resistant resin or its precursor containing the additives for modifying a shielding layer.

In yet another preferred embodiment of the present invention, a method for producing a solid electrolytic capacitor as described above has an additive for modifying the shielding layer that is a surface tension-controlling agent or a thixotropic agent.

Effects of Invention

The solid electrolytic capacitor of the present invention comprises a shielding layer made of a fluid containing a heat resistant resin or its precursor in an area for separating the anode part and the cathode part of the substrate for a solid electrolytic capacitor comprising a porous layer on the surface, which fluid does not contain or contains a minute amount of additives for modifying the shielding layer.

The shielding layer is made of a fluid containing a masking material (a shielding member to ensure electrical insulation between the cathode part region and the anode part region and to prevent a solid electrolyte or a solution for forming a solid electrolyte from intruding into the anode part region from the cathode part region) comprising heat resistant resin or its precursor. Since the fluid containing a masking material does not contain or contains a minute amount of additives for modifying the shielding layer, the shielding layer comprising the masking material can be provided not only in the impregnated part inside the pores but also on the surface of the core material. As a result, the shielding layer enables to prevent the phenomenon in which a solid electrolyte or a liquid for forming a solid electrolyte intrudes and creeps up from the cathode part region to the anode part region during the production process of a capacitor; to improve the insulation between the cathode part and the anode part; and to prevent deterioration of the leakage current property due to insufficient insulation; to thereby improve the yield and the reliability of the capacitor.

Particularly, in a solid electrolyte capacitor of the following description, the masking material sufficiently infiltrates to the core of the material as well as to the porous layer. Such a solid electrolyte capacitor has a first layer, which is formed by being laminated directly on the substrate for a solid electrolytic capacitor having a porous layer on the surface among the shielding layers formed by laminating a plurality of layers in the region separating the anode part region and the cathode part region of the substrate, that is made of a solution or a dispersion of a heat resistant resin or its precursor without containing additives for modifying the shielding layer (except a silane coupling agent) or containing additives for modifying the shielding layer in an amount of 0.1 mass % or less (based on the mass of the heat resistant resin or its precursor).

Furthermore, in the solid electrolytic capacitor, wherein the second layer, which is formed by being laminated on the first layer formed by being laminated directly on the substrate for a solid electrolytic capacitor, is made of a solution or a dispersion of a heat resistant resin or its precursor containing additives for modifying the shielding layer, creeping up of a solid electrolyte during polymerization does not occur and as a result, it enables to effectively reduce the occurrence of the leakage current failure due to the creeping up of a solid electrolyte.

Figure 1:
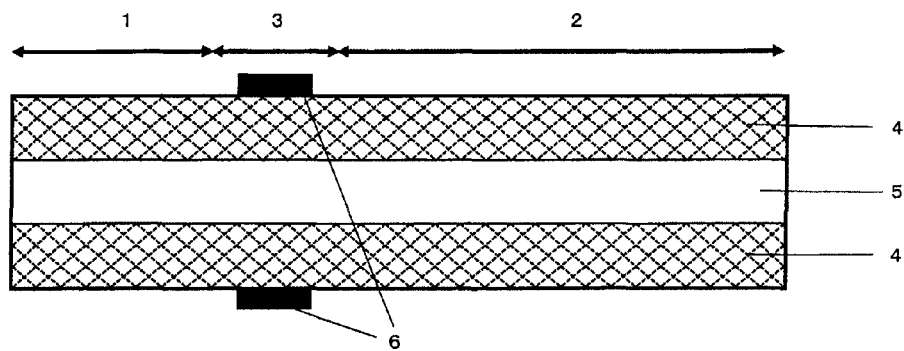
FIG. 1 is a schematic view of a cross-section of an example of the solid electrolytic capacitor of the present invention.

EXPLANATION OF REFERENCE NUMBERS 1 anode part
2 cathode part
3 boundary
4 porous layer
5 core
6 shielding material (masking material layer)
7 solid electrolyte

BEST MODE FOR CARRYING OUT THE INVENTION

Hereinafter, the substrate for solid electrolytic capacitor, the capacitor using the substrate and production method thereof of the present invention are explained by referring to drawings attached hereto.

The substrate for solid electrolytic capacitor used in the present invention is a material for capacitor having a porous layer on the surface, preferably, a valve-action metal substrate having micropores, and particularly preferably a valve-action metal substrate having a dielectric oxide film on the surface. The valve-action metal substrate is a metal foil of aluminum, tantalum, niobium, titanium, zirconium or alloys consisting of these metals as base metals, a metal bar, or a sintered body containing these metals as its main component. These metal substrates have dielectric oxide films as a result of surface oxidation by oxygen present in the air. The substrate to be used is subjected to etching treatment in advance by using a known method to thereby make the surface porous. Next, it is preferable that a dielectric oxide film be formed by chemical formation according to a known method, for sure.

It is preferable that the valve-action metal substrate having the surface roughened be used after cut out into a desired size for the solid electrolytic capacitor.

As a valve-action metal, although the thickness depends on intended uses, generally, those having a thickness of about 40 to 150 µm are employed. Also, although the size and shape of the valve-action metal foil depend on intended uses, generally, preferred are rectangular or square foils of about 1 to 50 mm in width and 1 to 50 mm in length as a flat-plate element unit. More preferred are those of 2 to 20 mm in width and 2 to 20 mm in length, particularly preferred are 2 to 5 mm in width and 2 to 6 mm in length.

FIG. 1 is a cross-sectional view showing a pattern diagram of an example of the solid electrolytic capacitor of the present invention.

Figure 2:
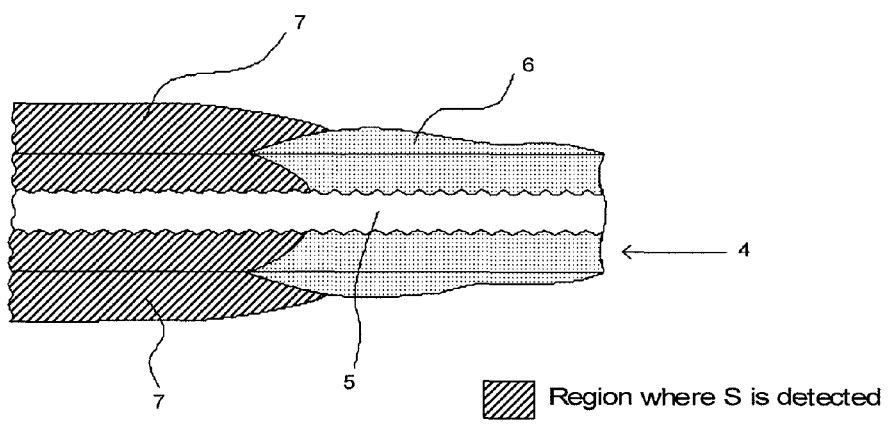
FIG. 2 is a schematic view of an example of the structure of the masking layer of the solid electrolytic capacitor of the present invention. This schematic view is a schematic cross-sectional view of the masking layer cut along with a line corresponding to A-A' in FIG. 3.

There is no limitation on the shape of the substrate for solid electrolytic capacitor substrate. For example, in an etched aluminum foil for plate-type element unit, this type of etched aluminum foil, commercially available, has a core material (5) (aluminum) in the core of the foil and on both surfaces of the core are etched porous layers (4). Generally, in a case where this is used as a substrate for solid electrolytic capacitor, the region in the vicinity of one end is used as anode part region (1), and the opposite region is used as cathode part region (2). The intervening region (3) between the two regions is boundary region (3) separating the anode part region (1) from cathode part region (2), in which a shielding layer (6) made of a masking material of the present invention is formed. According to the present invention, a masking material sufficiently filtrates into the core material as well as to the porous layer (4). FIG. 2 is a schematic view showing the structure of a shielding layer (masking layer) (6) of the solid electrolytic capacitor of the present invention in FIG. 1. In a solid electrolytic capacitor in FIGS. 1 and 2, wherein, among the shielding layer (6) formed by laminating a plurality of layers in an area (3) for separating the anode part (1) and the cathode part (2) of the substrate for a solid electrolytic capacitor having a porous layer on the surface, a second shielding layer which is formed by being laminated on the first layer formed by being laminated directly on the substrate for a solid electrolytic capacitor is made of a solution or a dispersion of a heat resistant resin or its precursor containing additives for modifying the shielding layer, creeping up of a solid electrolyte (7) into the anode part region (1) during polymerization does not occur and as a result, it enables to sufficiently reduce the occurrence of the leakage current failure due to the creeping up of a solid electrolyte.

FIG. 2 also shows a result of the structure analysis by electron probe microanalysis (EPMA) of the masking portion of the solid electrolytic capacitor. That is, from the observation of the detected distribution of the sulfur element (S) in Example 1, it is confirmed that the region in which the solid electrolyte (7) is distributed (region where S is detected) is clearly separated and that the masking material (6) prevents the infiltration of the solid electrolyte (7).

For a masking material, common heat resistant resin, preferably a heat resistant resin soluble or swellable in a solvent, or a precursor of the resin can be used. Here, "heat resistant resin" indicates a resin resistant to a reflow temperature at the time of mounting the capacitor. The specific examples of the resin include polyphenylsulfone (PPS) resin, polyethersulfone (PES) resin, cyanic ester resin, fluorine resin (e.g. tetrafluoroethylene resin and tetrafluoroethylene-perfloroalkyl vinyl ether copolymer), polyimide resin and precursor thereof.

Preferred examples of the masking material include polyimide, polyamic acid varnish containing organic solvent as a precursor of polyimide and a monomer solution containing the aromatic tetracarboxylic acid component and the aromatic diamine component disclosed in JP-A-H10-182820 (U.S. Pat. No. 5,891,986).

The masking layer constituting a shielding layer by applying a masking material on the substrate for a solid electrolytic capacitor and laminating layers can be provided in more than one places as requested. For example, a first masking layer can be provided at an appropriate place to prevent the creeping up of the chemical formation solution into the anode part of the solid electrolytic capacitor. Accordingly, the masking material used for the first masking layer is not particularly limited and above-mentioned common heat-resistant resin can be used. Also, aside from this, a second masking layer can be provided in the region separating the anode part region and the cathode part region of the substrate for a solid electrolytic capacitor. For the second masking layer, the same materials as those used for the first masking layer can be used, and particularly preferred is polyimide, which possesses high adhesive strength to a valve-acting metal and high packing density, and is resistant to heat treatment as high as about 450° C., thereby providing excellent electrical insulation properties. Conventionally, there has been polyimide which is imidized by heat treatment at high temperature after applying a solution dissolving polyamic acid as a precursor of polyimide in a solvent. However, such polyimide requires heat treatment at a temperature of from 250 to 350° C., which leads to a problem such as the damage of the dielectric layer on the surface of the anode foil due to the heat. The present invention enables to use polyimide which can be sufficiently cured by a heat treatment at a low temperature of 200° C. or lower, preferably at a temperature of from 100 to 200° C., having low external shock such as damage or breakage of the dielectric layer on the surface of the anode foil due to the heat.

Polyimide is a compound containing an imide structure in the main chains. Examples of the polyimide which can be preferably used in the present invention include the compound represented by the following formulae (1) to (4) each having a flexible structure allowing intramolecular rotation in the diamine component skeleton, and the compound represented by the following formula (5) obtained by a polycondensation reaction of 3,3',4,4'-diphenylsulfonetetracarboxylic dianhydride with aromatic diamines. The average molecular weight of the compound is preferably from about 1,000 to 1,000,000, more preferably from about 2,000 to 200,000.

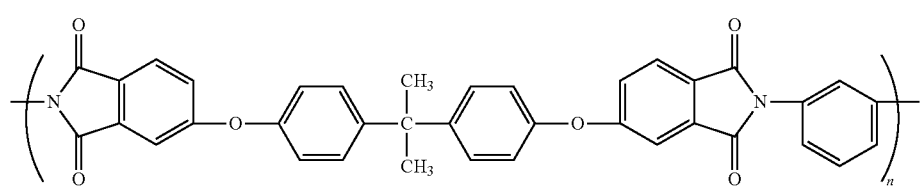

(1)

(ULTEM™, produced by General Electric Co.)

-continued

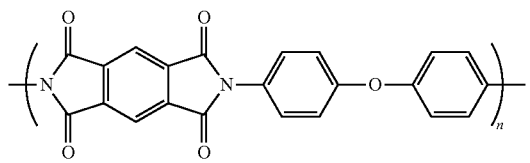

(VESPEL™ SP, produced by E. I. du Pont de Nemours & Co.)

(2)

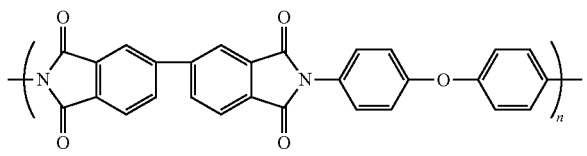

(UPIMOL™ R, produced by UBE Industries, Ltd.)

(3)

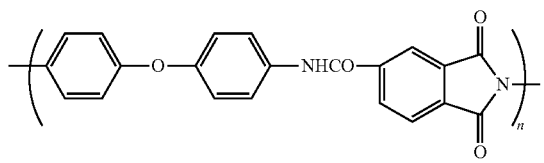

(TORLON™, produced by Amoco Chemicals Corp.)

(4)

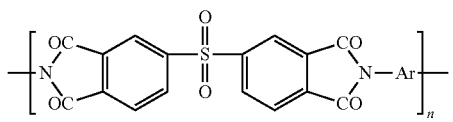

(DSDA polyimide)

(5)

The masking material such as polyimide is soluble or dispersible in an organic solvent, and a shielding layer is formed by applying the solution or dispersion. A solution or dispersion of the masking material of an arbitrary solid content concentration (in turn arbitrary viscosity) suitable for the applying operation can be easily prepared. The solid content concentration of the solution or dispersion is preferably from about 10 to 60 mass %, more preferably from about 35 to 60 mass %. The viscosity is preferably from about 50 to 30,000 cP, more preferably from about 500 to 15,000 cP. The lower the concentration and the viscosity, the masking line may be easily blurred, and the higher the concentration and the viscosity, cowebbing and the like of the masking material tends to occur, which makes the width of the masking line unstable.

The coating layer of the masking material formed by applying a solution or dispersion of the masking material may be subjected to drying, heating and light-irradiation treatment as needed to promote curing.

In the present invention, the fluid containing the masking material used for the first layer formed by being laminated directly on the substrate for a solid electrolytic capacitor is characterized in that the fluid does not contain the additives for modifying a shielding layer which additives are generally contained in a masking material, or contains the additives in an amount of 0.1 mass % or less to the solid content of the fluid. Such a fluid containing the masking material shows high penetration into the porous layer on the surface of the substrate for a solid electrolytic capacitor.

Such a fluid containing the masking material is prepared by dissolving or dispersing a heat-resistant resin or its precursor in an organic solvent so as to have a concentration suitable for the coating operation. In this case, the heat-resistant resin or its precursor without containing the additives for modifying the shielding layer is to be used. Additives for modifying the shielding layer are not to be added either in preparing the fluid containing a masking material.

In the present invention, additives for modifying the shielding layer indicate those exhibiting effects for modifying or reforming the physical properties of the heat-resistant resin constituting the shielding layer, except for a silane coupling agent. Typical additives for modifying the shielding layer contain a surface tension-controlling agent and a thixotropic agent. Generally, those materials are known as a leveling agent, a defoaming agent and a coating physical property modifying agent.

The surface tension-controlling agents include a defoaming agent and a silicone or non-silicone surface tension-controlling agent. Specific examples of the silicone surface tension-controlling agent include silicone oil, silicone surfactant and silicone synthetic lubricant. Examples of the non-silicone surface tension-controlling agent include lower alcohol, mineral oil, oleic acid, polypropylene glycol, higher fatty acid ester of glycerol, borate of higher fatty alcohol and a fluorine-containing surface active agent. The additive amount of the surface tension-controlling agent can is preferably 0 to 0.1 mass % (based on the mass of the heat resistant resin or its precursor).

Examples of the thixotropic agent include filler such as silica fine powder, mica, talc and calcium carbonate. The additive amount of the thixotropic agent is preferably 0 to 0.01 mass % (based on the mass of the heat resistant resin or its precursor).

Heat resistant resin or its precursor containing additives for modifying the shielding layer is commercially available. However, when using such a commercialized product for the first shielding layer formed in the region between the anode part region and the cathode part region of the substrate for a solid electrolytic capacitor, the additives for modifying the shielding layer need to be removed. In the case where several types of the additives for modifying the shielding layer are removed from a commercially-available masking material containing several types of the additives (masking material comprising a heat resistant resin or its precursor), it is possible to remove one additive at a time or to remove several types of additives simultaneously. The removal rate and the combination condition for removal may be determined by an experiment depending on the physical properties such as a pore distribution of the substrate for a solid electrolytic capacitor having a porous layer as a coated object.

A silane coupling agent may be incorporated in the masking material as needed. By containing an appropriate amount of a silane coupling agent, the crosslinking reaction of the resin is promoted, thereby improving the heat resistance and thus enabling to obtain a highly reliable insulating shielding film. For this reason, a silane coupling agent is excluded from the modifying additives, the content of which should be 0 to 0.1 mass % or less (based on the mass of the heat resistant resin or its precursor).

Specific examples of the silane coupling agent include tetramethoxysilane, methyltrimethoxysilane, ethyltrimethoxysilane, n-propyltrimethoxysilane, phenyltrimethoxysilane, 3-(trimethoxysilyl)propylamine, N-(2-aminoethyl)-3-aminopropyltrimethoxysilane, 3-(trimethoxysilyl)propylmetacrilate and 3-glycidoxypropyltrimethoxysilane. The additive amount of the silane coupling agent is preferably 0.1 to 5 mass %, more preferably, 0.3 to 4 mass % (based on the mass of the heat resistant resin or its precursor).

In the present invention, among the shielding layers formed by laminating layers, the second shielding layer formed on the first shielding layer which is formed by being laminated directly on the substrate for a solid electrolytic capacitor is preferably made of a solution or dispersion of a heat-resistant resin or its precursor containing the additives for modifying the shielding layer. In this case, a commercially available heat resistant resin or its precursor containing the additives for modifying the shielding layer can be used.

In the present invention, a first shielding layer is formed at first in the region separating the anode part region and the cathode part region of the substrate for a solid electrolytic capacitor having a porous layer on the surface, using a solution or dispersion of a heat-resistant resin or its precursor free from additives for modifying a shielding layer (except a silane coupling agent) or containing the additives for modifying the shielding layer in an amount of 0.1 mass % or less (based on the mass of the heat resistant resin or its precursor). Accordingly, the first shielding layer is formed by being laminated directly on the substrate for a solid electrolytic capacitor. Also, in the present invention, a shielding layer comprising a plurality of layers is formed by laminating layers on the first shielding layer so as to obtain a solid electrolytic capacitor comprising a shielding layer formed by laminating a plurality of layers. When forming a second shielding layer by being laminated on the first shielding layer, the second layer is formed by being laminated on the first shielding layer formed by being laminated directly on the substrate for a solid electrolytic capacitor. While the first shielding layer is made of a solution or dispersion of a heat-resistant resin or its precursor free additives for modifying a shielding layer (except a silane coupling agent) or containing the additives for modifying the shielding layer in an amount of 0.1 mass % or less, the second shielding layer may be made of a solution or dispersion of a heat resistant resin or its precursor which may or may not contain additives for modifying a shielding layer. It is particularly preferable to form the second shielding layer using a solution or dispersion of a heat resistant resin or its precursor which contains the additives for modifying the shielding layer since the masking layer sufficiently infiltrates into the core material as well as into a porous layer and also prevents the creeping up of a solid electrolyte into the anode part region during polymerization, which as a result can efficiently reduce the occurrence of the leakage current failure due to the creeping up of a solid electrolyte.

The shielding layer of the present invention comprises a shielding layer formed by laminating a plurality of layers in the region separating the anode part region and the cathode part region of the substrate for a solid electrolytic capacitor having a porous layer on the surface. The method for producing the first shielding layer formed by being laminated directly on the substrate for a solid electrolytic capacitor and the second shielding layer formed preferably by being laminated on the first shielding layer is not particularly limited except for using a solution or dispersion of the heat-resistant resin or its precursor, and the shielding layer can be formed by a method known per se for producing layers using the solution or dispersion. Examples of the method known per se for producing layers include a method allowing the solution or dispersion of the heat-resistant resin or its precursor (which may be referred to as "solution of the heat-resistant resin or the like") to penetrate into the region where a shielding layer is to be provided by applying, printing or potting followed by curing; a method for electrodepositing a solution of the heat-resistant resin or the like followed by curing (for example, a method of electrodepositing a solution containing a salt of polyamic acid to form a polyamic acid film and then dehydrating and curing it to obtain a polyimide film); a method of applying and curing the masking material solution capable of penetrating into the dielectric layer of the substrate for a solid electrolytic capacitor in which a shielding layer is made of a solution of the heat-resistant resin and the like and also forming a masking layer onto the impregnated part; and the like. In the case of using an aluminum foil piece of about 1 to 50 mm in width and 1 to 50 mm in length as a substrate for a solid electrolytic capacitor, the solution or the like is applied linearly in 0.1-2 mm-wide line on the foil centering on the position 0.5-45 mm from the edge of the aluminum foil once or multiple times as needed to penetrate into the foil and then cured. When forming a second shielding layer by being laminated on the first shielding layer, it is preferable to make the second shielding layer wider than the first shielding layer so that the second layer can cover the application width of the first shielding layer.

After forming the shielding layer on a part of the surface of the substrate comprising valve acting metal cut in a predetermined shape, the substrate is subjected to chemical formation treatment. Chemical formation treatment of the valve acting metal can be conducted by various kinds of methods. There are no particular limitations on conditions for chemical formation. For example, the metal can be chemically formed by using an electrolytic solution at least one selected from the group consisting of oxalic acid, adipic acid, boric acid and phosphoric acid, under conditions that the concentration of the electrolytic solution is from 0.05 to 20 mass %, that the temperature is 0 to 90° C., that current density is 0.1 to 200 mA/cm$^2$, that voltage is set to a value depending on the formation voltage of a film already formed on the chemically formed foil and that the chemical formation time is within 60 minutes. More preferably, the chemical formation is carried out under selected conditions of the concentration of the electrolytic solution of 0.1 to 15 mass %, the temperature of 20 to 70° C., the current density of 1 to 100 mA/cm$^2$ and the chemical formation time within 30 minutes.

In the above chemical formation treatment, conditions such as kind and concentration of electrolytic solution, the temperature, current density and chemical formation time may be arbitrarily selected as long as dielectric oxide film formed on the surface of valve-action metal material is not destroyed or deteriorated.

Examples of solid electrolyte include electroconductive polymers comprising as repeating unit a structure represented by a compound having a thiophene skeleton, a compound having a polycyclic sulfide skeleton, a compound having a pyrrole skeleton, a compound having a furan skeleton or a compound having an aniline skeleton. However, the electroconductive polymer for forming the solid electrolyte is not limited to these examples.

Examples of compound having a thiophene skeleton include derivatives of 3-methyl thiophene, 3-ethyl thiophene, 3-propyl thiophene, 3-butyl thiophene, 3-pentyl thiophene, 3-hexyl thiophene, 3-heptyl thiophene, 3-octyl thiophene, 3-nonyl thiophene, 3-decyl thiophene, 3-fluoro thiophene, 3-chloro thiophene, 3-bromothiophene, 3-cyanothiophene, 3,4-dimethyl thiophene, 3,4-diethyl thiophene, 3,4-butylene thiophene, 3,4-methylene dioxythiophene and 3,4-ethylene dioxythiophene. These compounds can be obtained as commercially available products or prepared by known methods (e.g., see Synthetic Metals, 1986, Vol. 15, Page 169).

Examples of compound having a polycyclic sulfide skeleton usable here include a compound having 1,3-dihydro polycyclic sulfide (also called 1, 3-dihydrobenzo[c] thiophene) skeleton and a compound having a 1,3-dihydronaphtho[2, 3-c]thiophene skeleton. Further, examples include a compound having a 1,3-dihydroanthra[2,3-c] thiophene skeleton, and a compound having a 1,3-dihydronaphthaceno[2,3-c]thiophene skeleton. They can be prepared by known methods, such as the method described in Japanese Patent Application Laid-Open No. 8-3156(U.S. Pat. No. 5,530,139).

Furthermore, usable examples include a compound having a 1,3-dihydronaphtho[1,2-c]thiophene skeleton, a 1,3-dihydro phenanthra[2,3-c]thiophene derivative, a compound having a 1,3-dihydrotriphenylo[2,3-c]thiophene skeleton, and a 1,3-dihydrobenzo[a]anthraceno[7,8-c]thiophene derivative.

A compound containing nitrogen or N-oxide in a condensed ring can also be used. Examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide.

Examples of compound having a pyrrole skeleton include derivatives of 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylene dioxypyrrole and 3,4-ethylene dioxypyrrole. These compounds can be obtained as commercially available products or prepared by known methods.

Examples of compound having a furan skeleton include derivatives of 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran. These compounds can be obtained as commercially available products or prepared by known methods.

Examples of compound having an aniline skeleton include derivatives of 2-methylaniline, 2-ethylaniline, 2-propylaniline, 2-butylaniline, 2-pentylaniline, 2-hexylaniline, 2-heptylaniline, 2-octylaniline, 2-nonylaniline, 2-decylaniline, 2-fluoroaniline, 2-chloroaniline, 2-bromoaniline, 2-cyanoaniline, 2,5-dimethylaniline, 2,5-diethyl aniline, 3,4-butylene aniline, 3,4-methylene dioxyaniline and 3,4-ethylene dioxyaniline. These compounds can be obtained as commercially available products or prepared by known methods.

The compound selected from above compound groups may be used singly or in a combination of two or more thereof as an electrically conductive polymer comprising a binary or ternary copolymer. The composition ratio between the polymerizable monomers in copolymerization depends on physical properties of the electrically conductive polymer to be obtained and polymerization ratio can be confirmed by carrying out simple tests.

In the production of the electroconductive polymer of the present invention, polymerization of the above-mentioned compounds is conducted in the presence of an antioxidant and furthermore in the presence of counter anion having dopant ability as needed.

The oxidant to be used can be any oxidant which can cause oxidation as dehydrogenative 4-electron oxidation reaction satisfactorily. Specifically, compounds relatively inexpensive from industrial viewpoint and easy to handle in the production process are includes. Specific examples include Fe(III) compounds such as $FeCl_3$, $FeClO_4$ and Fe(organic acid anion) salt, anhydrous aluminum chloride/cuprous chloride, alkali metal persulfates, ammonium persulfates, peroxides, manganese compounds such as potassium permaganate, quinones such as 2,3-dichloro-5,6-dicyano-1,4-benzoquinone(DDQ),tetrachloro-1,4-benzoquinone and tetracyano-1,4-benzoquinone, halogens such as iodine and bromine, sulfonic acids such as peracid, sulfuric acid, fuming sulfuric acid, sulfur trioxide, chlorosulfuric acid, fluorosulfuric acid and amidosulfonic acid and ozone. These oxidants may be used singly or in combination of two or more thereof.

Among these, examples of basic compound of an organic acid anion forming the Fe (organic acid anion) salt include organic sulfonic acid, organic carboxylic acid, organic phosphoric acid and organic boric acid. Examples of organic sulfonic acid include benzenesulfonic acid, p-toluene sulfonic acid, methanesulfonic acid, ethanesulfonic acid, α-sulfonaphthalene, β-sulfo-naphthalene, naphthalene disulfonic acid, and alkyl naphthalene sulfonic acid (including as alkyl groups, butyl, triisopropyl, di-t-butyl and the like).

Examples of organic carboxylic acid usable here include polymer electrolyte anions of acetic acid, propionic acid, benzoic acid and oxalic acid. Further in the present invention, polyacrylic acid, polymethacrylic acid, polystyrene sulfonic acid, polyvinyl sulfonic acid, polyvinyl sulfuric acid, poly-α-methylsulfonic acid, polyethylene sulfonic acid and polyphosphoric acid. However, these are cited only for purposes of illustration of organic sulfonic acid and organic carboxylic acid and not for limitation.

Counter cations of the above anions are $H^+$, alkali metal ions such as, $Na^+$ and $K^+$ or ammonium ions substituted with tetramethyl group, tetraethyl group, tetrabutyl group or tetraphenyl group. In the present invention, there is no particular limitation on the cations.

Among the above oxidants, those containing trivalent Fe compounds, cuprous chloride compounds, alkali metal persulfates, ammonium persulfates, manganese compounds or quinones are particularly preferred and can be suitably used.

In the present invention, examples of counter anion having dopant ability allowed to coexist when necessary in production of electroconductive polymer used as solid electrolyte include electrolytic compounds having oxidant anions (reductant of oxidant) generated from above-described oxidants as counter anions and other anion-based electrolytes. Specific examples include protonic acid anions such as halogenated anions of 5B-Group elements such as $PF_5^-$, $SbF_6^-$ and $AsF_5^-$, halogenated anions of 3B-Group elements such as $BF_4^-$, halogen anions such as $I^-$ ($I_3^-$), $Br^-$ and $Cl^-$, halogen acid anions such as $ClO_4^-$, Lewis acid anions such as $AlCl_4^-$, $FeCl_4^-$ and $SnCl_5^-$, Inorganic acid anions such as $NO_3^-$ and $SO_4^{2-}$, organic sulfonic acid anions such as p-toluene sulfonic acid, naphthalene sulfonic acid, alkyl-substituted sulfonic acid having 1 to 5 carbon atoms, $CH_3SO_3^-$ and $CF_3SO_3^-$, and such as carboxylic acid anions such as $CF_3COO^-$ and $C_6H_5COO^-$. Further, examples include polymer electrolyte anions of polyacrylic acid, polymethacrylic acid, polystyrene sulfonic acid, polyvinyl sulfonic acid, polyvinyl sulfuric acid, poly-α-methyl sulfonic acid, polyethylene sulfonic acid and polyphosphoric acid. However, the present invention is not limited thereto.

However, preferred are high-molecular-weight or low-molecular-weight organic sulfonic acid or polyphosphoric acid. It is desirable that aryl sulfonate dopant be used. For example, salt of benzenesulfonic acid, toluenesulfonic acid, naphthalenesulfonic acid, anthracenesulfonic acid, anthraquinonesulfonic acid or derivatives of these compounds can be used.

The concentration of monomer forming an electroconductive polymer used for preparing the solid electrolyte substrate in the present invention varies depending on the kinds of substituents of the compounds, solvent and the like. Generally, it is preferable that the concentration be within a range of $10^{-3}$ to 10 mol/L, more preferably from $10^{-2}$ to 5 mol/L. The reaction temperature is determined according to reaction method and cannot be flatly defined. Generally, the temperature is selected from the range of −70 to 250° C., preferably −30 to 150° C., more preferably −10 to 30° C.

In the present invention, any reaction solvent can be used as long as it can dissolve each of monomer, oxidant and counter anion having dopant ability separately or dissolve a mixture thereof. Examples thereof include ethers such as tetrahydrofuran, dioxane and diethylether; polar aprotic solvents such as dimethylformamide, acetonitrile, benzonitrile, N-methylpyrrolidone and dimethylsulfoxide; esters such as ethyl acetate and butyl acetate; non-aromatic chlorine-based solvents such as chloroform and methylene chloride, nitro compounds such as nitromethane, nitroethane and nitrobenzene; alcohols such as methanol, ethanol and propanol; organic acids such as formic acid, acetic acid and propionic acid; acid anhydrides of these organic acids (such as acetic anhydride); water; alcohols and ketones. These solvents can be used singly or in combination of two or more thereof. Moreover, the oxidant or/and counter anion having dopant ability and monomer can be handled by dissolving each of them separately in a solvent, that is, in two-liquid system or three-liquid system.

The conductivity of the thus produced solid electrolyte is 1 S/cm or more, preferably 5 S/cm or more, more preferably 10 S/cm or more.

Further, by providing a carbon paste layer and an electroconductive layer containing metal powder on the surface of the solid electrolyte layer, a cathode part of the capacitor is formed. The electroconductive layer containing metal powder is closely adhered onto the solid electrolyte layer to thereby serve as cathode and also serve as a layer for attaching a cathode lead terminal to the final capacitor product. The thickness of the electroconductive layer containing metal powder is not limited. Generally the thickness is about from 1 to 100 μm, preferably 5 to 50 μm.

Generally, the substrate for solid electrolytic capacitor according to the present invention is used in a laminate-type capacitor element. In a laminate-type solid electrolytic capacitor, a lead frame may be processed to have a rotundate shape by chamfering corners, i.e., cutting angles to round them off to some extent. Also, the opposing cathode bonding part can be allowed to play the role of lead terminal.

There are no particular limitations on materials for lead frame as long as the material is widely used one. It is desirable that the lead frame is constructed from copper-base (such as Cu—Ni base, Cu—Ag base, Cu—Su base, Cu—Fe base, Cu—Ni—Ag base, Cu—Ni—Sn base, Cu—Co—P base, Cu—Zn—Mg base and Cu—Sn—Ni—P base alloys) materials and materials having on the surface copper-base plating, in consideration for obtaining good efficiency in chamfering corners of the lead frame.

A solid electrolytic capacitor is obtained by attaching a lead terminal to a lead frame bonded to an anode part, attaching a lead terminal to a cathode part consisting of solid electrolyte layer, carbon paste layer and an electroconductive layer containing metal powder, and then sealing the whole body with an insulating resin such as epoxy resin.

The solid electrolytic capacitor of the present invention may be any capacitor using a substrate for solid electrolytic capacitor having porous layer on the surface. The invention is not limited by the solid electrolyte and structures explained above in detail.

EXAMPLES

The present invention is described in detail below by referring to Examples and Comparative Examples, however, the present invention is not limited to these Examples.

Example 1

A chemically formed aluminum foil having thickness of 110 μm (prepared by chemical formation at a voltage of 3V) which had been cut to be 3.5 mm in width was cut so that each piece was 13 mm in length. One of short sides of each piece was fixed to a metal support by welding.

In preparation for chemical formation of cut surfaces, a 0.8 mm-wide line was drawn by using polyimide resin solution (solid content of 40 mass %) containing 1.0 mass % of 3-glycidoxy propyltrimethoxysilane (produced by Shin-Etsu Chemical Co., Ltd.) as a silane coupling agent, polyether-modified silicone oil (produced by Shin-Etsu Chemical Co., Ltd.) as a defoaming agent of 1.0 mass % to the amount of polyimide resin, silica powder as filler of 0.09 mass % to the amount of polyimide resin at a position of 7 mm from the other short side which was not fixed, and was dried at 180° C. for 30 minutes. As the first chemical formation (formation of cut surfaces) process, the part from the edge of the unfixed end of the aluminum foil to the polyimide resin line was chemically formed in an oxalic acid solution of 5 mass % at a current density of 5 mA/cm2, formation voltage of 3V and temperature of 65° C. for seven minutes; washed with water and dried. Next, as the second chemical formation process, the foil was chemically formed in a sodium silicate solution at a current density of 1 mA/cm2, formation voltage of 3 V and a temperature of 65° C.; washed with water and dried in the same way. Subsequently, the foil was subjected to heat treatment at 300° C. for 30 minutes. Furthermore, as the third chemical formation process, the foil was chemically formed in an ammonium adipate solution of 9 mass % at a current density of 3 mA/cm$^2$, a formation voltage of 3 V and a temperature of 65° C. for ten minutes; washed with water and dried in the same way.

Next, as an undercoating, a 0.5 mm-wide line was drawn by using polyimide resin solution (solid content of 40 mass %) containing a silane coupling agent of 1.0 mass % to the amount of polyimide resin and without containing the defoaming agent and the filler in an area for separating the anode part and the cathode part; left to stand for ten minutes to make the line penetrate into the etching layer. Subsequently, the polyimide resin solution (solid content of 40 mass %) containing a silane coupling agent of 1.0 mass % to the mass of the polyimide resin and without containing the defoaming agent and the filler was applied in the same way to give two coats in total, followed by drying at 80° C. for 30 minutes and then at 180° C. for another 30 minutes. Next, as a finish coating, a 0.8 mm-wide line was drawn by using polyimide resin solution (solid content of 40 mass %) containing 1.0 mass % of 3-glycidoxy propyltrimethoxysilane (produced by Shin-Etsu Chemical Co., Ltd.) as a silane coupling agent, polyether-modified silicone oil (produced by Shin-Etsu Chemical Co., Ltd.) as a defoaming agent of 1.0 mass % to the amount of polyimide resin, silica powder as filler of 0.09 mass % to the amount of polyimide resin so as to cover the undercoating portion; and dried at 80° C. for 30 minutes and then at 180° C. for another 30 minutes.

[Evaluation on the Creeping Up]

A subset of the dried foils were evaluated for the creeping up as follows:

A portion in 3.5 mm×4.6 mm of the foil to serve as a cathode part was immersed in a mixed solution in which the mass ratio of a water-soluble ink solution to isopropanol solution is 2 to 1. When the foil was pulled out after 30 minutes, the ink blot was observed to evaluate the presence of the creeping up of the masking agent to the upper portion.

With respect to the rest of the foil pieces, solid electrolyte as a cathode layer was formed as follows to produce a capacitor.

That is, the cathode region (3.5 mm×4.6 mm) was immersed in an isopropanol solution (solution 1) containing 3,4-ethylenedioxythiophene, pulled out and left standing. Subsequently, after the cathode part was immersed in a solution (solution 2) containing ammonium persulfate, it was dried to cause oxidation polymerization. The operation from the step of immersion in solution 1 through the step of immersion in solution 2 for oxidation polymerization was repeated. Then, the cathode part was washed with hot water at 50° C., and dried at 100° C. The solid electrolyte layer was formed thereon. Moreover, a portion in 3.5 mm×4.6 mm of the foil on which the solid electrolyte layer was formed was immersed in a 15 mass % of ammonium adipate solution and subjected to chemical reformation at a voltage of 3.5 V to form the electrode on the cathode portion by using carbon paste and silver paste, to thereby complete each capacitor element.

Two capacitor elements were stacked on a lead frame by bonding the part containing the applied masking material with silver paste. To part without solid electrolyte formed thereon, an anode lead terminal was connected by welding. The whole was encapsulated with epoxy resin and subjected to aging by applying a voltage of 2 V at 135° C. In this way, 200 chip-type capacitors were produced.

[Evaluation of Electrical Properties]

Capacitance and loss factor (tan δ×100%) at 120 Hz, equivalent series resistance (hereinafter, referred to as ESR) at 100 kHz and leakage current of these 200 capacitors produced in the ways mentioned above were measured as initial properties. The leakage current was measured one minute after the rated voltage was applied.

The defective rate is shown assuming that the capacitor with a leakage current of 0.005 CV or more was defective. The results are shown in Table 2.

[Reflow Test]

The reflow test (which is also called "solder heat resistance test") was conducted in the following method. That is, 50 capacitor elements were prepared, the elements were allowed to pass through a temperature of 255° C. for 10 seconds, which was repeated twice. The leakage current was measured one minute after the rated voltage was applied. Assuming that the element with leakage current of 0.04 CV or more was defective, the results are shown in Table 3.

[Analysis of the Structure of the Masking Portion of the Capacitor]

A capacitor material (sample), wherein an aluminum foil was used as a metal material in the process for forming solid electrolyte in Example 1 and a solid electrolyte layer comprising a sulfur-containing polymer (3,4-ethylenedioxythiophene polymer) layer was formed, was put in epoxy resin (trade name: Quetol-812) and fixed by heat curing the resin at 30 to 60° C. for 20 to 30 hours. The enlarged cross-sectional view of the masking portion in which a shielding layer (6) is provided cut along the line corresponding to line A-A' in FIG. 3 (at 1500-fold magnification) is shown in FIG. 4.

The masking portion was cut along line A-A' using a microtome, and a two-dimensional distribution of specific elements was observed by mapping analysis using the electron probe microanalyzer (EPMA) which is a device for analyzing the elemental composition contained in a minute volume (about 1 $\mu m^3$). The electron probe microanalyzer enables trace element analysis with the coefficient variation from 1 to several percent per unit volume of 1 $\mu m^3$. The schematic view of the element distribution is shown in FIG. 2. The schematic view, FIG. 2, schematically illustrates a cross-section of the masking portion cut along the line corresponding to A-A' line in FIG. 3. In the magnified photograph of FIG. 4, masking layer (6), dielectric layer (4) and aluminum core (5) are observed. The aluminum core (5) and dielectric layer (4) in FIG. 2 contains elemental aluminum, solid electrolyte (7) contains elemental sulfur, solid electrolyte (7) and masking layer (6) contain elemental carbon. Accordingly, by analyzing the elements such as carbon, sulfur and aluminum, the distributions of the masking material and the polymer are clarified with respect to each portion of (5), (4), (7) and (6). The observation of the region where elemental sulfur (S) is detected found that the region where the solid electrolyte (7) is distributed was clearly divided in the dielectric layer (4) and that the masking layer (6) comprising the masking material which penetrates into the dielectric film of the dielectric layer (4) and also forms the masking layer on the penetrated part blocks the infiltration of solid electrolyte (7). Here, blocking the infiltration means that the solid electrolyte material does not exist in the penetrated part of the masking material in an amount of 5 mass % or more. This value can be determined from the detection limits for elements to be identified by the electron probe microanalyzer and the content of the elements to be identified in the solid electrolyte.

As shown in the above results, a capacitor made by using the element for a solid electrolytic capacitor of the present invention enables to attain capacitor properties improved in the electrical properties in terms of leakage current, capacitance and the like. The mechanism is presumed that while the masking material penetrates into the dielectric film of the dielectric layer (4) and forms a masking layer (6) on the penetrated part, the solid electrolyte cannot penetrate into the dielectric film, thereby providing a structure such that the solid electrolyte is completely blocked by the masking material forming the masking layer (6) on the penetrated part.

Figure 3:
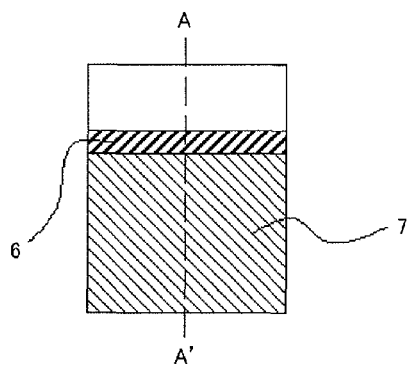
FIG. 3 is a schematic view of an example of the masking part of the solid electrolytic capacitor of the present invention.
Figure 4:
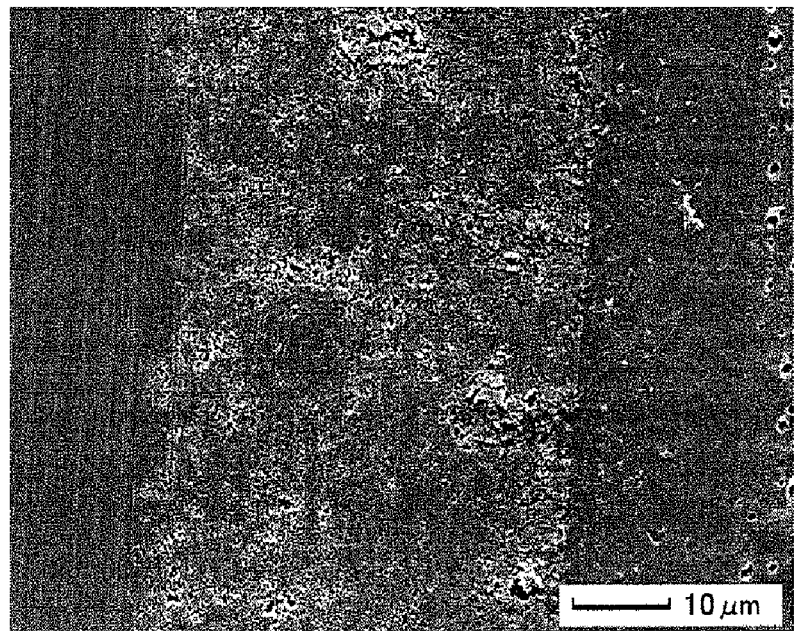
FIG. 4 is an enlarged sectional photograph of the masking part of Example 1 (at a 1500-fold magnification).
Figure 5:
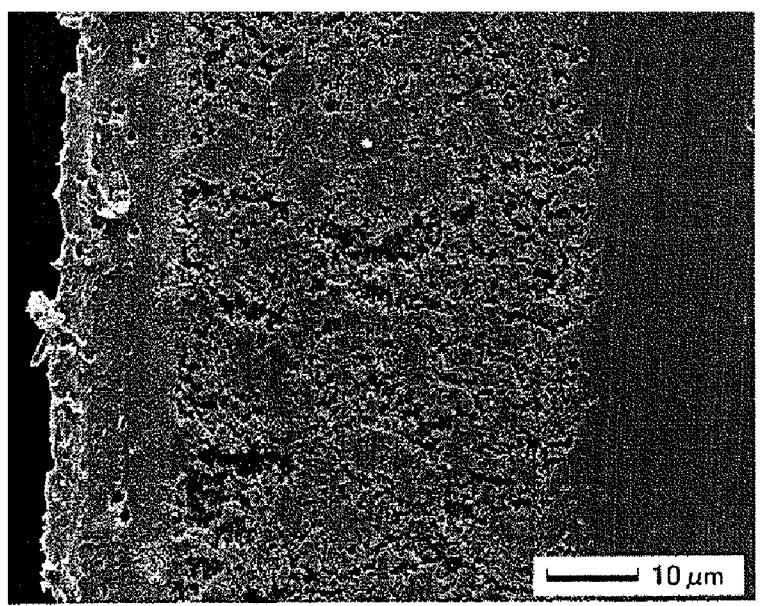
FIG. 5 is an enlarged sectional photograph of the masking part of Comparative Example 1 (at a 1500-fold magnification).

When one observes FIG. 4, which is an enlarged cross-sectional view (at a 1500-fold magnification) of the masking portion provided with a shielding layer (6) and cut along the line corresponding to A-A' line in FIG. 3, the masking material sufficiently penetrates into the dielectric film and can even infiltrate deep in the aluminum etching layer and fully reaches to the aluminum core (5), thereby filling the pores in the dielectric film of the dielectric layer (4) and penetrating deep enough into the pores. While a masking material does not penetrate into the dielectric film and interconnected pores are observed in Comparative Example 1 (FIG. 5), which is not according to the present invention, the masking material according to the present invention sufficiently penetrates into such pores to fill them and the pores failed to be filled are remarkably few and small. Accordingly, it is presumed that the solid electrolyte (7) cannot filtrate in the dielectric film of the dielectric layer (4) which is impregnated with the masking material and is completely blocked by the masking material forming a masking layer (6) on the penetrated part.

Example 2

The capacitor to be evaluated was produced in the same way as in Example 1 except that the polyimide resin solution (solid content of 40 mass %) containing a silane coupling agent of 1.0 mass % to the mass of the polyimide resin and without containing the defoaming agent and the filler was applied once as a first coat in an area for separating the anode part and the cathode part.

Example 3

The capacitor to be evaluated was produced in the same way as in Example 1 except that, as a first coat in an area for separating the anode part and the cathode part, polyimide resin solution (solid content of 40 mass %) containing the silane coupling agent of 1.0 mass % to the mass of the polyimide resin and defoaming agent of 0.09 mass % to the mass of the mass of the polyimide resin and without containing the filler was applied linearly once centering on a position of 5 mm from the end of the foil so that the solution runs to 0.10 mg per a 0.5-millimeter-wide foil piece; left standing for ten minutes to allow the solution to penetrate; and again polyimide resin solution (solid content of 40 mass %) containing the silane coupling agent of 1.0 mass % to the mass of the polyimide resin and defoaming agent of 0.09 mass % to the mass of the mass of the polyimide resin and without containing the defoaming agent and the filler was applied linearly once centering on a position of 5 mm from the end of the foil so that the solution runs to 0.10 mg per a 0.8-millimeter-wide foil piece.

Example 4

The capacitor to be evaluated was produced in the same way as in Example 1 except that, as a first coat in an area for separating the anode part and the cathode part, polyimide resin solution (solid content of 40 mass %) containing the silane coupling agent of 1.0 mass % to the mass of the polyimide resin and defoaming agent of 0.09 mass % to the mass of the mass of the polyimide resin and without containing the defoaming agent and the filler was applied linearly once centering on a position of 5 mm from the end of the foil so that the solution runs to 0.10 mg per a 0.8-millimeter-wide foil piece.

Example 5

The capacitor to be evaluated was produced in the same way as in Example 1 with the following exceptions. As a first coat in an area for separating the anode part and the cathode part, polyimide resin solution (solid content of 40 mass %) containing the silane coupling agent of 1.0 mass % to the mass of the polyimide resin and without containing the defoaming agent and the filler was applied linearly once centering on a position of 5 mm from the end of the foil so that the solution runs to 0.10 mg per a 0.5-millimeter-wide foil piece; left standing for ten minutes to allow the solution to penetrate; and dried at 80° C. for 30 minutes and at 180° C. for another 30 minutes. Next, as a finish coating, a 0.8 mm-wide line was drawn once by using polyimide resin solution (solid content of 40 mass %) containing the silane coupling agent of 1.0 mass % to the mass of the polyimide resin and without containing the defoaming agent and the filler so as to cover the first coat; and dried at 80° C. for 30 minutes and at 180° C. for another 30 minutes.

Example 6

The capacitor to be evaluated was produced in the same way as in Example 1 with the following exceptions. As a first coat in an area for separating the anode part and the cathode part, polyimide resin solution (solid content of 40 mass %) containing the silane coupling agent of 1.0 mass % to the mass of the polyimide resin and defoaming agent of 0.09 mass % to the mass of the mass of the polyimide resin and without containing the filler was applied linearly once centering on a position of 5 mm from the end of the foil so that the solution runs to 0.10 mg per a 0.5-millimeter-wide foil piece; left standing for ten minutes to allow the solution to penetrate; and dried at 80° C. for 30 minutes and at 180° C. for another 30 minutes. Next, as a finish coating, a 0.8 mm-wide line was drawn once by using polyimide resin solution (solid content of 40 mass %) containing the silane coupling agent of 1.0 mass % to the mass of the polyimide resin and without containing the defoaming agent and the filler so as to cover the first coat; and dried at 80° C. for 30 minutes and at 180° C. for another 30 minutes.

Comparative Example 1

The capacitor to be evaluated was produced in the same way as in Example 1 except that, a polyimide resin solution (solid content of 40 mass %) containing the silane coupling agent of 1.0 mass %, the defoaming agent of 1.0 mass % to the mass of the polyimide resin and the filler of 0.09 mass % to the mass of the polyimide resin was applied linearly once.

TABLE 1

| | Evaluation of creeping up Judgment of the existence of creeping up by immersion solution for evaluation |
|---|---|
| Example 1 | Non-existent |
| Example 2 | Non-existent |
| Example 3 | Non-existent |
| Example 4 | Non-existent |
| Example 5 | Non-existent |
| Example 6 | Non-existent |
| Comparative Example 1 | Existent |

TABLE 2

| | Initial properties | | | | |
|---|---|---|---|---|---|
| | Capacitance [μF] | Loss factor [%] | ESR [mΩ] | Leakage current [μA] | Number of short circuits [units] |
| Example 1 | 99.3 | 0.91 | 9.9 | 0.31 | 1 |
| Example 2 | 97.6 | 1.08 | 10.2 | 0.20 | 2 |
| Example 3 | 96.9 | 0.93 | 8.8 | 0.24 | 3 |
| Example 4 | 97.3 | 0.93 | 10.1 | 0.28 | 2 |
| Example 5 | 97.5 | 0.99 | 9.6 | 0.26 | 2 |
| Example 6 | 97.1 | 1.01 | 9.8 | 0.28 | 3 |
| Comparative Example 1 | 96.3 | 1.07 | 11.4 | 0.32 | 16 |

TABLE 3

| | Reflow test | | |
|---|---|---|---|
| | Leakage current [μA] | Number of defective products | Number of short circuits |
| Example 1 | 0.33 | 1 | 0 |
| Example 2 | 0.34 | 2 | 0 |
| Example 3 | 0.27 | 0 | 0 |
| Example 4 | 0.30 | 1 | 0 |
| Example 5 | 0.29 | 1 | 0 |

TABLE 3-continued

| | Reflow test | | |
|---|---|---|---|
| | Leakage current [μA] | Number of defective products | Number of short circuits |
| Example 6 | 0.31 | 1 | 0 |
| Comparative Example 1 | 0.46 | 4 | 1 |

As seen in Table 2, the leakage current is reduced on the whole and the rejection rate is significantly lowered in the capacitor according to the present invention; and it is confirmed that the method of the present invention is very effective.

INDUSTRIAL APPLICABILITY

By forming a first layer in the shielding layer formed by laminating a plurality of layers on top of each other, provided in an area for separating an anode part and a cathode part of the substrate for a solid electrolytic capacitor having a porous layer on its surface from a solution or dispersion of a heat resistant resin or its precursor, free from a shielding layer modification additive (except for a silane coupling agent) or containing a shielding layer modification additive content of not more than 0.1% by mass (based on the mass of the heat resistant resin or its precursor), the present invention enables to prevent solid electrolyte or a solution for forming solid electrolyte from creeping up into the anode part from the cathode part in the production process of a solid electrolyte capacitor using a substrate for a solid electrolyte capacitor having a porous layer on the surface so as to further improve the insulation performance between the cathode part and the anode part. As a result, it can inhibit deterioration of the leakage current property due to the insulation failure, thereby providing improvement in the yield and reliability. Furthermore, in a solid electrolyte capacitor wherein the second layer, which is formed by being laminated on the first layer formed by being laminated directly on the substrate for a solid electrolytic capacitor, is made of a solution or a dispersion of a heat resistant resin or its precursor containing additives for modifying the shielding layer, creeping up of a solid electrolyte during polymerization does not occur and as a result, it enables to sufficiently reduce the occurrence of the leakage current failure due to the creeping up of a solid electrolyte.

Accordingly, the solid electrolytic capacitor of the present invention can be widely employed with the same uses as conventional solid electrolytic capacitors produced using a substrate for a solid electrolytic capacitor having a porous layer on the surface.

The invention claimed is:

1. A solid electrolytic capacitor, comprising a substrate, a porous layer, and a laminated shielding layer,
wherein the porous layer is disposed on a surface of the substrate and the laminated shielding layer is disposed on the substrate, in an area so as to separate an anode part and a cathode part of the substrate,
wherein the laminated shielding layer comprises a plurality of layers, among which, a first shielding layer is laminated directly on the substrate and is made of a solution or a dispersion of a heat resistant resin or its precursor, and
wherein the solution or the dispersion contains additives for modifying the first shielding layer (except for a silane coupling agent) in an amount of 0.1 mass % or less (based on the mass of a heat resistant resin or its precursor).

2. The solid electrolytic capacitor as claimed in claim 1, wherein the additive for modifying the shielding layer is a surface tension-controlling agent and a thixotropic agent.

3. The solid electrolytic capacitor as claimed in claim 1, wherein the solution or dispersion of the heat resistant resin or its precursor is a solution of a polyimide resin or a varnish of polyamic acid.

4. The solid electrolytic capacitor as claimed in claim 1, wherein the solution or dispersion of the heat resistant resin or its precursor is a solution of a polyimide resin or a varnish of poly(amic acid) and the solution or the varnish contains a silane coupling agent of 0.1 to 5 mass % (based on the amount of the polyimide resin or poly(amic acid)) without containing a surface tension-controlling agent and a thixotropic agent as additives for modifying the shielding layer; or contains a total amount of 0.1 mass % or less of a surface tension-controlling agent and a thixotropic agent (based on the mass of the heat resistant resin or its precursor).

5. The solid electrolytic capacitor as claimed in claim 1, wherein a second shielding layer formed on the first shielding layer which is formed by being laminated directly on the substrate for a solid electrolytic capacitor is made of a solution or dispersion of a heat resistant resin or its precursor containing the additives for modifying the shielding layer.

6. The solid electrolytic capacitor as claimed in claim 5, wherein the additive for modifying the shielding layer is a surface tension-controlling agent or a thixotropic agent.

7. A substrate for a solid electrolytic capacitor, comprising a heat-resistant resin layer having a laminated shielding layer formed of a plurality of layers disposed on at least a part of the substrate, which further has a porous layer disposed on a surface of the substrate,
wherein, among the plurality of layers, a first shielding layer is laminated directly on the substrate and is made of a solution or a dispersion of a heat resistant resin or its precursor, and
wherein the solution or the dispersion contains additives for modifying the first shielding layer (except for a silane coupling agent) in an amount of 0.1 mass % or less (based on the mass of a heat resistant resin or its precursor).

8. The substrate for a solid electrolytic capacitor as claimed in claim 7, wherein the additive for modifying the shielding layer is a surface tension-controlling agent and a thixotropic agent.

9. The substrate for a solid electrolytic capacitor as claimed in claim 7, wherein the solution or dispersion of the heat resistant resin or its precursor is a solution of a polyimide resin or a varnish of polyamic acid.

10. The substrate for a solid electrolytic capacitor as claimed in claim 7, wherein the solution or dispersion of the heat resistant resin or its precursor is a solution of a polyimide resin or a varnish of polyamic acid and the solution or the varnish contains a silane coupling agent of 0.1 to 5 mass % (based on the mass of the polyimide resin or polyamic acid) without containing a surface tension-controlling agent and a thixotropic agent as additives for modifying the shielding layer; or contains a total amount of 0.1 mass % or less of a surface tension-controlling agent and a thixotropic agent (based on the mass of the heat resistant resin or its precursor).

11. The substrate for a solid electrolytic capacitor as claimed in claim 7, wherein a second shielding layer formed on the first shielding layer which is formed by being laminated directly on the substrate for a solid electrolytic capacitor is made of a solution or dispersion of a heat resistant resin or its precursor containing the additives for modifying the shielding layer.

12. The substrate for a solid electrolytic capacitor as claimed in claim 11, wherein the additive for modifying the shielding layer is a surface tension-controlling agent and a thixotropic agent.

13. A method for producing a solid electrolytic capacitor comprising a substrate, a porous layer, and a laminated shielding layer, wherein the porous layer is disposed on a surface of the substrate and the laminated shielding layer is disposed on the substrate, in an area so as to separate an anode part and a cathode part of the substrate, wherein the laminated shielding layer comprises a plurality of layers, among which, a first shielding layer is laminated directly on the substrate and is made of a solution or a dispersion of a heat resistant resin or its precursor, and wherein the solution or the dispersion or contains additives for modifying the first shielding layer (except for a silane coupling agent) in an amount of 0.1 mass % or less (based on the mass of a heat resistant resin or its precursor)

the method comprising, forming the first shielding layer being laminated directly on the substrate for the solid electrolytic layer among the shielding layer formed by laminating layers by applying the solution or dispersion of the heat resistant resin or its precursor or containing the additives for modifying the first shielding layer (except for a silane coupling agent) in an amount of 0.1 mass % or less (based on the mass of the heat resistant resin or its precursor) to a region separating a region of the anode part and a region of the cathode part of the substrate for a solid electrolytic capacitor followed by drying.

14. The method for producing a solid electrolytic capacitor as claimed in claim 13, wherein the additive for modifying the shielding layer is a surface tension-controlling agent and a thixotropic agent.

15. The method for producing a solid electrolytic capacitor as claimed in claim 13, wherein the solution or dispersion of the heat resistant resin or its precursor is a solution of a polyimide resin or a varnish of polyamic acid.

16. The method for producing a solid electrolytic capacitor as claimed in claim 13, wherein the solution or dispersion of the heat resistant resin or its precursor is a solution of a polyimide resin or a varnish of poly(amic acid) and the solution or the varnish contains a silane coupling agent of 0.1 to 5 mass % (based on the mass of the polyimide resin or polyamic acid) without containing a surface tension-controlling agent and a thixotropic agent as additives for modifying the shielding layer; or contains a total amount of 0.1 mass % or less of a surface tension-controlling agent and a thixotropic agent (based on the mass of the heat resistant resin or its precursor).

17. The method for producing a solid electrolytic capacitor as claimed in claim 13, wherein a second shielding layer, which is formed on the first shielding layer formed by being laminated directly on the substrate for a solid electrolytic capacitor among the shielding layers formed by laminating layers, is made of a solution or dispersion of a heat resistant resin or its precursor containing the additives for modifying a shielding layer.

18. The method for producing a solid electrolytic capacitor as claimed in claim 17, wherein the additive for modifying the shielding layer is a surface tension-controlling agent or a thixotropic agent.

* * * * *